United States Patent Office 3,580,811

Patented May 25, 1971

3,580,811

SYNTHETIC FERMENTATION MEDIUM AND PROCESS USING SAME FOR CULTIVATING *GIBBERELLA ZEAE*

Phil Hidy, Terre Haute, Ind., assignor to Commercial Solvents Corporation

No Drawing. Continuation-in-part of application Ser. No. 670,455, Sept. 25, 1967. This application Apr. 16, 1968, Ser. No. 721,606

Int. Cl. C12b *3/02;* C12d *13/00*

U.S. Cl. 195—100 21 Claims

ABSTRACT OF THE DISCLOSURE

A synthetic fermentation medium, particularly for use in the production of an anabolic and estrogenic substance identified in U.S. Pat. No. 3,196,019, by cultivation of the microorganism *Gibberella zeae* (Gordon). The medium includes exfoliated vermiculite as a support for the microorganism and an aqueous nutrient production medium containing a sugar such as glucose as the carbohydrate source for the microorganism.

This application is a continuation-in-part of copending application Ser. No. 670,455, filed Sept. 25, 1967, now abandoned.

This invention relates to improved methods for the production and recovery of an anabolic and estrogenic substance such as is described in U.S. Letters Patent 3,196,019, i.e., a compound having the structural formula:

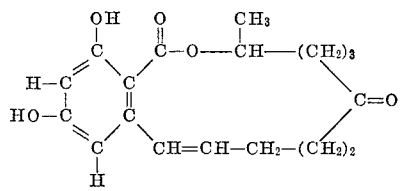

The compound described above is, as described in U.S. Pat. No. 3,196,019, produced by cultivating the microoragnism *Giberella zeae* (Gordon) on a suitable nutrient medium and will be hereinafter described as F.E.S., standing for Fermentation Estrogenic Substance. In producing F.E.S. the spores or the vegetative mycelia of the microorganism are incubated in a suitable inoculation medium. Heretofore, the microorganism-containing inoculation medium has then been introduced into a fermentation medium containing one of the common grains as the carbohydrate source, i.e., finely divided corn. After a fermentation period of about 6 to 20 days, or more, the F.E.S. produced can be recovered from the fermentation medium, e.g. as described in U.S. Patent 3,196,019, by extracting the fermentation medium with 95% ethanol, concentrating the ethanol extract, dissolving the concentrated extract in chloroform, extracting the chloroform solution with 5% sodium carbonate solution having an adjusted pH of about 9–12, and then acidifying the sodium carbonate extract with hydrochloric acid to a pH of about 6 to 6.5 to precipitate the solid impure F.E.S.

A method for production of F.E.S. utilizing synthetic fermentation media is now provided in accordance with this invention whereby improved conversions of carbohydrate to F.E.S. are realized and improved methods of recovery of F.E.S. from the fermentation media can be used whereby improved overall yields of F.E.S. can be obtained.

In general the synthetic fermentation medium of this invention includes an inert support material and an aqueous production medium containing as an assimilable carbohydrate source a sugar such as glucose for instance.

Other nutrients in the fermentation medium advantageously include an assimilable nitrogen source as well as minerals, for instance sodium, potassium, magnesium, ammonium, chloride and phosphate ions.

The support material is preferably a material which is inert to the organism, insoluble in the recovery process solvents, and has a porosity sufficient to absorb the production medium. Exfoliated vermiculite which has such desirable properties as high porosity, high void volume to surface area ratio, low density, relative chemical inertness and availability in a wide range of particle sizes is the preferred support material. Vermiculite is a micaceous mineral generally identified chemically as a hydrated magnesium-aluminum-iron silicate, with a platelet-type, or laminar, crystal structure which exfoliates when heated or subjected to certain chemical reactions. The mineral occurs naturally in an unexpanded state and is mined in conventional manners. The largest domestic deposits of vermiculite are located in Montana and South Carolina. Chemical analyses of vermiculite from the two areas, see Table I, indicate that they are essentially the same.

TABLE I

| | Percent | |
|---|---|---|
| | Montana | South Carolina |
| $SiO_2$ | 38.64 | 38.66 |
| $MgO$ | 22.68 | 20.04 |
| $Al_2O_3$ | 14.94 | 17.36 |
| $Fe_2O_3$ | 9.29 | 8.45 |
| $K_2O$ | 7.84 | 5.24 |
| $CaO$ | 1.23 | 0.75 |
| $Cr_2O_3$ | 0.29 | 0.50 |
| $Mn_3O_4$ | 0.11 | 0.12 |
| $P_2O_5$ | Trace | Trace |
| S | Trace | Trace |
| Cl | 0.28 | 0.52 |
| $H_2O$ | 5.29 | 8.71 |
| Total | 100.59 | 100.36 |

The mined ore is milled to controlled sizes and then exfoliated. Exfoliation is generally accomplished by dropping the milled ore in a continuous stream through a furnace, the chamber temperature of which is variously reported as from about 1400 to 2200° F. During exfoliation, each granule or particle or vermiculite expands to several times its original size and traps within itself thousands of air cells. The exfoliation of vermiculite crystals results in large pores being formed between groups of platelets. Thus, exfoliation makes available a large increase in void volume without significantly changing the surface area of the platelets.

In general, the smaller the particle size of the exfoliated vermiculite used in this invention the greater the yields of F.E.S. The particles should not, however, be so fine as to make filtration difficult which would complicate F.E.S. recovery. The smaller particles are preferred since they will hold more liquid, i.e. aqueous production medium, without actually becoming wet whereas in larger vermiculite particles the space between the vermiculite particles becomes so large that it cannot physically support the mycelium which is the vegetable growth of the microorganism. Particles which pass a U.S. Sieve Series, sieve No. 1, and are retained by sieve No. 100 are suitable for this invention. In smaller fermentations, that is those using less of the synthetic medium, the smaller sizes are actually preferred since, although filtration difficulties may be increased, the total amount of vermiculite being worked is less which tends to alleviate these difficulties. Additionally, in smaller fermentations, the support is generally provided in thinner layers so that heat transfer and oxygen transfer throughout the support is easier than in larger fermentations.

The bulk density of exfoliated vermiculite is a general measure of the porosity of exfoliated vermiculite which is one of its desirable features. The lower the bulk density, the greater the porosity of the vermiculite for a given particle size. Although the bulk density can vary for a given particle size, it is generally known that the bulk density of exfoliated vermiculite diminishes as the temperature of exfoliation is increased until a level is reached after which there is practically no further reduction in density. It is also known that the friability, that is the tendency of the exfoliated vermiculite to mechanically break down in handling, increases with increasing temperature. In general, the bulk density of the exfoliated vermiculite used in this invention should not be so small that the vermiculite particles collapse upon application of the liquid production medium, or upon being transported, and should not be so high that the porosity of the vermiculite is insufficient to support the desired amount of aqueous production medium. Exfoliated vermiculite having bulk densities of above 4 pounds per cubic foot, or about 5 to 10, or even 12 pounds per cubic foot are suitable for use in this invention, although preferably the bulk density is less than about 8 or 9 pounds per cubic foot and is particularly in the range of about 5 to 7 pounds per cubic foot. Exfoliated vermiculite is commercially available in several grades of sieve size and bulk density including those marketed by W. R. Grace and Company under the trade names Zonolite, Verxite or Terralite which are respectively, insulation grade, pure chemical grade and agricultral grade vermiculites. Several grades of these commercially available exfoliated vermiculites are identified in Table II by their average density and sieve analysis.

TABLE II.—SIEVE ANALYSIS, STANDARD GRADES

| Grade No. | U.S. std. sieve size | Cumulative percent retained | |
|---|---|---|---|
| | | Maximum | Minimum |
| 1 Density: 4 to 7 lbs. per cu. ft. Sieve analysis (by weight) | ⅜ | 10 | 0 |
| | 4 | 60 | 30 |
| | 8 | 95 | 65 |
| | 16 | 100 | 85 |
| 2 Density: 4 to 8 lbs. per cu. ft. Sieve analysis (by weight) | 4 | 5 | 0 |
| | 8 | 80 | 0 |
| | 16 | 99 | 5 |
| | 30 | 100 | 0 |
| 3 Density: 5 to 9 lbs. per cu. ft. Sieve analysis (by weight) | 8 | 10 | 0 |
| | 16 | 60 | 20 |
| | 30 | 95 | 65 |
| | 50 | 98 | 75 |
| | 100 | 100 | 90 |
| 4 Density: 6 to 10 lbs. per cu. ft. Sieve analysis (by weight) | 16 | 5 | 0 |
| | 30 | 65 | 15 |
| | 50 | 98 | 60 |
| | 100 | 100 | 90 |

The amount of inert support material normally desired will vary depending up the particular container being used. Factors involved in selection of the amount of support material are the requirement of the microorganism for air and the necessity to remove carbon dioxide produced with the F.E.S. Additionally, the temperature of the medium should be controlled within narrow limits during F.E.S. production. Accordingly, normally a relatively thin layer, e.g. about 1 or 1½ inches to 6 inches, preferably about 3 to 5 inches, or less, of synthetic medium is preferred.

The assimilable carbohydrate source in the aqueous fermentation medium is advantageously sugar, preferably a mono- or di-saccharide such as glucose, sucrose or maltose and is present in the aqueous medium in amounts sufficient for reduction by the microorganim to produce F.E.S. and below the amount at which it begins to crystallize out of the medium. Generally, the carbohydrate, e.g. glucose, is present in amounts from about 20% to about 50% by weight of the production medium, preferably between about 30 and 45% by weight. In addition to the carbohydrate source, nutrient media utilized also require the presence of a nitrogen source in either organic or inorganic form such as urea, ammonium salts such as ammonium sulfate, ammonium nitrate, ammonium chloride, ammonium tartrate, etc. Also, a source of potassium and phosphorus such as dipotassium phosphate, for instance, is advantageously used for suitable yields as are trace minerals containing such minerals as manganese, magnesium, iron, etc., in compounds such as magnesium sulfate, ferrous sulfate, manganese sulfate, etc. The amounts of the various minerals can vary considerably although each should be present in an amount sufficient to insure proper growth of the microorganism. Generally, amounts of the minerals sufficient to provide the desired ions in the medium in amounts of about 0.001 to 1% by weight are sufficient. Preferred minerals, or ions, and amounts are potassium (K+), about 0.01 to 1.0% by weight, phosphorus (as $HPO_4-$), about 0.01 to 1% by weight, particularly about 0.15 to 0.5%; and sodium nitrate and ammonium nitrate, each in amounts of from about 0.1 to 3 or 5%. Yeast is also included in the aqueous production medium in an amount sufficient to provide the necessary growth factors, e.g. B vitamins, for the microorganism. Preferably, distilled water, or deionized water, is used in the production medium although tap water can be used if reduced yields of F.E.S. are acceptable. A basic production medium suitable for use with this invention is illustrated in Table III with the percentages listed being grams per 100 cc. to make up the final medium.

TABLE III

| | Percent | Grams |
|---|---|---|
| Yeast | 0.1 | 2.5 |
| $FeSO_4$(1 g./l. solution) | 1.5 | (¹) |
| KCl | 0.05 | 1.25 |
| $MgSO_4$ | 0.05 | 1.25 |
| $K_2HPO_4$ | 0.1 | 2.5 |
| $NaNO_3$ | 0.2 | 5.0 |
| $NH_4NO_3$ | 1.0 | 25 |
| Glucose | 30.0 | 750 |
| Deionized water | To 2,500 ml. | |

¹ 37.5 ml.

To form the synthetic fermentation medium, the aqueous production medium is advantageously added to the inert support material in an amount such that the support material does not become soggy but is moist substantially throughout each support particle. Generally, about 240 milliliters of production medium is sufficient for from about 40 to 240 grams of the support material, and preferably is used with about 80 grams. In covered fermentation trays containing a vermiculite layer about 3 inches deep and having surface dimensions of 20 by 40 inches, the production medium can be added in amounts up to about 19 or 20 liters per tray. Since, if a major portion of the vermiculite remains dry, the liquid will distribute so thinly that the microorganism will not grow properly, it is generally preferred to use above about 8 to 10 liters of production medium per tray. One factor affecting the desired amount of liquid medium is the bulk density of the exfoliated vermiculite. For example, in trays as described above, with the No. 2 grade vermiculite identified in Table II, optimum production of F.E.S. is obtained with about 15 liters of production medium per tray whereas with a No. 3 grade exfoliated vermiculite, optimum production is obtained with about 17 liters of production medium per tray.

F.E.S. is readily produced by cultivating the organism *Gibberella zeae* (Gordon) on the synthetic fermentation medium of this invention. A live culture of the organism is on deposit with the United States Department of Agriculture, Agricultural Research Service, Northern Utilization Research and Development Division, Peoria, Ill. under the number NRRL 3311. In carrying out the fermentation, an inoculum of the organism is prepared and mixed with the aqueous nutrient production medium for distribution throughout the inert support to provide the fermenation medium. If desired, the inoculum, medium and support can be mixed and then spread over the fermentation tray. During fermentation, the temperature of the fermentation medium is preferably controlled to provide for optimum production of F.E.S. by placing the fermentation container in a temperature controlled bath, such as a water bath, maintained generally at a temperature of from about 12 to 25° C., preferably about 14 to 19° C., particularly about 15 to 17° centigrade. The pH of the fermentation medium should be between about 4½ and 6½, preferably between 5 and 6. Under these conditions, a suitable yield of F.E.S. can be obtained in a period ranging from about 1 to 6 weeks, usually 4 to 5 weeks, depending upon the vitality of the microorganism. Recovery of the F.E.S. so produced can be accomplished by the method described in U.S. Pat. 3,196,019 although a preferred recovery process is described in applicant's copending application Ser. No. 670,393 filed Sept. 25, 1967.

The following examples serve to further illustrate this invention:

EXAMPLE I

Inoculum preparation

Spores from a well sporulated Bennett's agar slant culture of the organism Gibberella zeae, strain NRRL 3311, no more than two months old are suspended in 5 ml. of sterile water added to the slant tube and are transferred to a 500-ml. Erlenmeyer flask containing 100 ml. of sterile Bennett's medium. The inoculated flask is shaken on a rotary shaker at 30° C. for 24 hours. Ten ml. of the first stage inoculum is used to inoculate 300 ml. of sterile Bennett's medium in a 1 l. Erlenmeyer flask equipped with a side arm at the bottom of the flask to which is attached a length of rubber tubing having a short glass tube inserted at the terminus. The tube is covered with a milk filter disc and with paper to keep it sterile after sterilization. All flasks are closed with loose cotton plugs. The inoculated second stage is shaken on a reciprocal shaker at 30° C. for 24 hours.

EXAMPLE II

Fermentation procedure

Fermentations are conducted in aluminum trays (5 x 20 x 40 inches) covered by aluminum lids (2 x 20.5 x 40.5 inches) resting on six laboratory tubing clamps spaced equally and attached to the upper edge of the tray. This supports the under-surface of the lid about 0.25 inch above the upper edge of the tray.

The trays are filled to a level depth of 3 inches with exfoliated vermiculite; the lids are put in place; and the trays are autoclaved for about two hours at 15 p.s.i.g. In the control trays an insulation grade exfoliated vermiculite (broad, coarsely screened, mixed #1, #2, #3 grades Zonolite described in Table II above) is used.

A production medium for the fermentation is prepared according to the formula below.

MEDIUM

|  | Percent | Grams |
|---|---|---|
| Cerelose (37% glucose) | 40.7 | 22,996 |
| BYF 100—yeast | 0.1 | 56.5 |
| KCl | 0.05 | 28.25 |
| MgSO₄ | 0.05 | 28.25 |
| NaNO₃ | 0.2 | 28.25 |
| NH₄NO₃ | 1.0 | 113.0 |
| K₂HPO₄ (added last) | 0.1 | 565.0 |
| Distilled water | To 56.5 l. | |

Cerelose is a commercially available glucose monohydrate. All percentages are grams per 100 cc. to make up the final medium. Thirteen and one-half liter quantities are dispensed into 5-gallon stainless steel milk cans, the lids of which have been equipped with two stainless steel tubulatures, one of which just enters the lid and serves as an air inlet and the other of which extends to the bottom of the can with a bend which places the bottom orifice near the outer edge of the can. Lids are seated firmly in place. One end of a short piece of rubber tubing is attached to the air tubulature, the other to a piece of glass tubing in which is lightly packed a wad of glass wool to serve as an air filter. A longer piece of tubing is attached to the remaining tubulature. The glass air-filter and the end of the longer rubber tubing are covered with a milk filter disc and a paper outer covering and the can and contents are autoclaved 20 min. at 15 p.s.i.g.

The sterile production medium is inoculated by introducing the contents of one second-stage inoculum flask, prepared according to Example I, through the longer rubber tubing. Inoculum is thoroughly dispersed in the medium and the contents of one can are dispensed evenly through the longer rubber tube over the surface of the vermiculite in one tray. Siphoning of can contents is started by forcing air into the air tubulature.

The loaded trays are immersed to a depth of about two inches in a pan circulating water at an entrance temperature of 15–17° C. The circulation rate is adjusted so that the heat generated by the fermentation process does not increase the exit water temperature by more than one degree centigrade.

Incubation is continued for from two to six weeks, or until the concentration of F.E.S. reaches a maximum.

Sampling is done weekly by removing 15 spaced plugs 2 cm. in diameter cut through the entire depth of the cake. The plugs are crumbled by rubbing through a screen, mixed thoroughly and a 100 g. sample is assayed.

In the assay, one hundred grams of cake is extracted two times with water by grinding for about 30 seconds in a Waring Blendor. Each extract is removed by vacuum filtration. Combined water extracts total about 600–700 ml. Water extracted samples are air dried under heat lamps and are extracted three times with methanol in the same fashion. Combined methanol extracts total about 700–800 ml.

Methanol extracts are diluted with spectroscopic grade methanol to contain 5–10 μg. F.E.S. per ml. and the absorbance of the dilute solution is compared at 236 mμ with a standard solution of pure F.E.S. in spectroscopic methanol prepared to contain 10 μg. F.E.S. per ml. Absorbance at 236 mμ is directly proportional to concentration.

Results from a typical control fermentation carried out as described above are as follows:

|  | F.E.S. (g./tray) for— | | |
|---|---|---|---|
|  | 3 weeks | 4 weeks | 5 weeks |
| Tray: | | | |
| 1 | 126 | 179 | 217 |
| 2 | 134 | 174 | 188 |
| 3 | 139 | 170 | 166 |
| 4 | 55 | 145 | 231 |

EXAMPLE III

The effect of changes in the composition of the production medium of a control fermentation described in Example II upon the production of F.E.S. in fermentations carried out in two liter flasks in the manner described in Example II is illustrated by the following table. The procedure used is as described in Example II except that 80 grams of vermiculite and 240 ml. of production medium were used. Table III illustrates variables in the production medium and their effect upon the amount of F.E.S. produced.

TABLE III

| Variable | FES percent of control |
|---|---|
| Four times the amount of yeast | 90, 82 |
| Omit yeast, $FeSO_4$, and KCl | 76 |
| Omit yeast and $FeSO_4$ | 83 |
| Omit yeast and KCl | 80 |
| Omit $FeSO_4$ and KCl | 96 |
| Replace $K^+$ with $NH_4^+$ | 17 |
| Replace $K^+$ with $Na^+$ | 28 |
| Replace $Na^+$ with $K^+$ | 36 |
| Replace $SO_4^=$ and $Cl^-$ | 91 |
| Two times the amount of $NaNO_3$ | 73 |
| Two times the amount of $K_2HPO_4$ | 73 |
| Two times the amount of $PO_4^=$ as $KH_2PO_4$ | 73 |
| Two times the amount of $SO_4^=$ as $MgSO_4 + K_2SO_4$ | 14 |
| Two times the amount of $MgSO_4$ | 33 |
| Add $ZnCl_2$ (.05%) | 12 |
| Replace KCl with $ZnCl_2$ | 15 |
| Two times the amount of $NaNO_3$ and two times the amount of $NH_4NO_3$ | 28 |
| Omit $Mg^{++}$ | 80 |
| Add $Mn^{++}$ as $MnCl_2$ replacing KCl | 101 |
| Replace $Mg^{++}$ with $Mn^{++}$ | 80 |
| Replace yeast with two times the amount of $NaNO_3$ | 57 |
| Four times the amount of yeast and two times the amount of $NaNO_3$ | 89 |
| Four times the amount of yeast, two times the amount of $NaNO_3$ and two times the amount of $NH_4NO_3$ | 92 |
| Replace $Fe^{++}$ with $Mn^{++}$ | 80 |
| Replace $Fe^{++}$ with $Mn^{++}$ | 88 |

EXAMPLE IV

Fermentations A through C were carried out in the manner described in Example II with variation in the grade of exfoliated vermiculite used. The results of the production of F.E.S. at four weeks is as follows:

Fermentation A

| | 4 wks.(g./tray) |
|---|---|
| Control, as in Example II | 165 |
| Terralite, Sp. Gr. #2, an agricultural size Grade 2, as identified in Table II dusted to have a good particle size | 181 |
| Terralite, gr. #4 as identified in Table II | 180 |
| Terralite, gr. #3 as identified in Table II | 184 |
| Bar B base, large size vermiculite, less than number 1 U.S. sieve size made with a low exfoliation temp. | |
| Substrate, exfoliated vermiculite with a high bulk density on the order of Bar B base | 68 |

Fermentation B

| Terralite, gr. #4 see Table II | 173 |
|---|---|
| Terralite, gr. #3 see Table II | 183 |
| Control | 161 |
| Verxite, gr. #4 see Table II | 136 |
| Terralite, gr. #4 see Table II | 214 |

Fermentation C

| Control | 151 |
|---|---|
| Verxite, gr. #3 see Table II | 194 |
| Terralite, gr. #3 see Table II | 184 |
| Verxite, gr. #4 see Table II | 192 |
| Terralite, gr. #4 see Table II | 178 |

EXAMPLE V

Fermentations D through I were performed using the procedure of Example II with variation in the carbohydrate source and water.

Fermentation D

| | 4 wks.(g./tray) |
|---|---|
| Control (glucose, 37%) | 184 |
| Sucrose, 37% | 234 |

Fermentation E

| Control, Tray #1 (glucose, 37%) | 165 |
|---|---|
| Control, Tray #2 (glucose, 37%) | 176 |
| Sucrose, 37% | 237 |

Fermentation F

| Control (glucose, 37%) | 114 |
|---|---|
| Sucrose, 37% | 147 |
| Sucrose, 30% | 148 |

Fermentation G

| Control (glucose, 37%) | 134 |
|---|---|
| Sucrose, 37% | 190 |
| Maltose, 37% | 83 |
| A 1:1 mixture of sucrose and maltose, 37% | 119 |

Fermentation H

| | Grams/tray for— | |
|---|---|---|
| | 4 weeks | 5 weeks |
| Sucrose, dist. $H_2O$ | 196 | 222 |
| Sucrose, dist. $H_2O$ | 172 | 228 |
| Sucrose, tap $H_2O$ | 156 | 180 |
| Sucrose, tap $H_2O$ | 142 | 198 |

Fermentation I

| Sucrose, dist. $H_2O$ | 192 | 222 |
|---|---|---|
| Sucrose, dist. $H_2O$ | 213 | 218 |
| Sucrose, deionized $H_2O$ | 219 | 251 |
| Sucrose, deionized $H_2O$ | 208 | 246 |

EXAMPLE VI

The following table illustrates utilization of different amounts of production medium used in fermentations J and K carried out on trays according to the procedure of Example II.

Fermentation J

| | Grams/tray for— | |
|---|---|---|
| | 4 weeks | 5 weeks |
| Control, 13½ l. production medium | 189 | 192 |
| Control, 14 l. production medium | 195 | 194 |
| Control, 14½ l. production medium | 206 | 205 |
| Control, 15 l. production medium | 256 | 214 |

Fermentation K

| Control, 13½ l. production medium | 223 | 218 |
|---|---|---|
| Control, 15 l. production medium | 250 | 234 |
| Control, 15½ l. production medium | 228 | 234 |
| Control, 16 l. production medium | 243 | 230 |

It is claimed:

1. A synthetic fermentation medium, especially for use in cultivation of the microorganism *Gibberella zeae*, consisting essentially of a support of exfoliated vermiculite having a particle size between about sieve number 1 and sieve number 100, U.S. Sieve Series, and a bulk density of between about 4 and 12 pounds per cubic foot and an aqueous nutrient medium containing assimilable carbohydrate source and assimilable nitrogen source, said carbohydrate source being a sugar and being present in solution in the nutrient medium in an amount sufficient for reduction by the microorganism but below the amount at which the sugar begins to crystallize out of the medium.

2. The medium of claim 1 wherein the nutrient medium is included in a ratio of about 240 milliliters for about 40 to 240 grams of the exfoliated vermiculite.

3. The medium of claim 1 wherein the sugar is selected from the group consisting of glucose, sucrose and maltose.

4. The medium of claim 3 wherein the nutrient medium is included in a ratio of about 240 milliliters for about 40 to 240 grams of the exfoliated vermiculite.

5. The medium of claim 4 wherein the nutrient medium contains potassium, phosphorus, sodium and nitrogen ions, each in an amount sufficient to insure proper growth of the microorganism.

6. The medium of claim 3 wherein thhe vermiculite has a bulk density of between about 5 and 10 pounds per cubic foot.

7. The medium of claim 3 wherein the vermiculite has a bulk density of between about 5 and 7 pounds per cubic foot.

8. The medium of claim 3 wherein the nutrient medium contains potassium, phosphorus, sodium and nitrogen ions, each in an amount sufficient for growth of the microorganism.

9. The medium of claim 8 wherein the amounts of ions are between about 0.001 and 1% by weight of the nutrient medium.

10. A synthetic fermentation medium, especially for use in cultivation of the microorganism *Gibberella zeae*, consisting essentially of a support of exfoliated vermiculite having a particle size between about sieve number 1 and sieve number 100, U.S. Sieve Series, and a bulk density in the range of about 5 to 7 pounds per cubic foot and an aqueous nutrient medium containing about 30 to 45 percent of dissolved sugar selected from the group consisting of glucose, sucrose and maltose and about 0.001 to 1 percent of assimilable potassium, phosphorus, sodium and nitrogen ions, said percentages being based on the weight of the nutrient medium, and said support being present in the fermentation medium in a ratio of about 40 to 240 grams per each 240 milliliters of said nutrient medium.

11. The medium of claim 10 wherein the support of exfoliated vermiculite is arranged in a bed having a depth of about 1 to 6 inches.

12. In a process for the production of the compound $$\text{HO} \underset{\text{HO}}{\underset{|}{\bigcirc}} \overset{\overset{\text{O}}{\underset{\|}{\text{C}}}---\text{O}---\overset{\overset{\text{CH}_3}{|}}{\text{CH}}-(\text{CH}_2)_3}{\underset{\text{CH}=\text{CH}-\text{CH}_2-(\text{CH}_2)_2}{\diagdown}} \text{C}=\text{O}$$

by cultivation of the microorganism *Gibberella zeae*, the improvement of cultivating the microorganism in a synthetic fermentation medium consisting essentially of a support of exfoliated vermiculite having a particle size between about sieve number 1 and sieve number 100, U.S. Sieve Series, and a bulk density of between about 4 and 12 pounds per cubic foot and an aqueous nutrient medium containing assimilable carbohydrate source and assimilable nitrogen source, said carbohydrate source being a sugar and being present in solution in the nutrient medium in an amount sufficient for reduction by the microorganism to produce said compound but below the amount at which the sugar begins to crystallize out of the medium, said cultivating being for a period of time sufficient to produce the compound, and thereafter recovering the compound.

13. The process of claim 12 wherein the sugar is selected from the group consisting of glucose, sucrose and maltose.

14. The process of claim 13 wherein the vermiculite has a bulk density of between about 5 and 10 pounds per cubic foot.

15. The process of claim 14 wherein the nutrient medium is included in a ratio of about 240 milliliters for about 40 to 240 grams of the exfoliated vermiculite.

16. The process of claim 15 wherein the cultivation is carried out at a temperature of about 12 to 25° C.

17. The process of claim 16 wherein the temperature is about 15 to 17° C.

18. The process of claim 12 wherein the cultivation is carried out at a temperature of about 14 to 19° C.

19. The process of claim 16 wherein the microorganism is the *Gibberella zeae* strain NRRL 3311.

20. In a process for the production of the compound $$\text{HO} \underset{\text{HO}}{\underset{|}{\bigcirc}} \overset{\overset{\text{O}}{\underset{\|}{\text{C}}}---\text{O}---\overset{\overset{\text{CH}_3}{|}}{\text{CH}}-(\text{CH}_2)_3}{\underset{\text{CH}=\text{CH}-\text{CH}_2-(\text{CH}_2)_2}{\diagdown}} \text{C}=\text{O}$$

by cultivation of strain NRRL 3311 of the microorganism *Gibberella zeae*, the improvement of cultivating the microorganism at a temperature of about 15 to 17° C., in a synthetic fermentation medium consisting essentially of a support of exfoliated vermiculite having a particle size between about sieve number 1 and sieve number 100, U.S. Sieve Series, and a bulk density in the range of about 5 to 7 pounds per cubic foot and an aqueous nutrient medium containing about 30 to 45 percent of dissolved sugar selected from the group consisting of glucose, sucrose and maltose, yeast and about 0.001 to 1 percent of assimilable potassium, phosphorus, sodium and nitrogen ions, said percentages being based on the weight of the nutrient medium, and said support being present in the fermentation medium in a ratio of about 40 to 240 grams per each 240 milliliters of said nutrient medium, said cultivating being for a period of time sufficient to produce the compound, and thereafter recovering the compound.

21. The process of claim 20 wherein the support of exfoliated vermiculite is arranged in a bed having a depth of about 1 to 6 inches.

References Cited

UNITED STATES PATENTS

| 3,028,312 | 4/1962 | Le Mense | 195—195 |
| 3,196,019 | 7/1969 | Andrews et al. | 99—2 |
| 3,373,025 | 3/1968 | Hodge et al. | 99—2 |

LIONEL M. SHAPIRO, Primary Examiner

U.S. Cl. X.R.

195—36; 116